United States Patent
Kolundzija et al.

(10) Patent No.: US 11,843,899 B1
(45) Date of Patent: Dec. 12, 2023

(54) MEETING-TRANSPARENT SOUND TRIGGERS AND CONTROLS

(71) Applicant: Cisco Technology, Inc., San Jose, CA (US)

(72) Inventors: Mihailo Kolundzija, Lausanne (CH); Rafal Pilarczyk, Plock (PL)

(73) Assignee: CISCO TECHNOLOGY, INC., San Jose, CA (US)

( * ) Notice: Subject to any disclaimer, the term of this patent is extended or adjusted under 35 U.S.C. 154(b) by 8 days.

(21) Appl. No.: 17/829,512

(22) Filed: Jun. 1, 2022

(51) Int. Cl.
*H04N 7/15* (2006.01)
*H04L 65/403* (2022.01)
*H04L 12/18* (2006.01)

(52) U.S. Cl.
CPC ........... *H04N 7/15* (2013.01); *H04L 12/1822* (2013.01); *H04L 65/403* (2013.01)

(58) Field of Classification Search
CPC ......... H04N 7/15; H04L 12/18; H04L 65/403; G06F 3/167; G06F 3/165; G10L 15/22; G10L 2015/223
USPC .......................................... 348/14.01–14.16
See application file for complete search history.

(56) References Cited

U.S. PATENT DOCUMENTS

| | | |
|---|---|---|
| 2012/0308044 A1 | 12/2012 | Vander Mey et al. |
| 2013/0051543 A1 | 2/2013 | McDysan et al. |
| 2014/0122085 A1 * | 5/2014 | Piety ....................... G01M 7/00 702/56 |
| 2020/0314483 A1 | 10/2020 | Rakshit et al. |
| 2020/0356340 A1 * | 11/2020 | Hanes ..................... G06F 3/167 |
| 2022/0036013 A1 | 2/2022 | Liu et al. |
| 2022/0383871 A1 * | 12/2022 | Kumar .................... G06F 3/167 |

OTHER PUBLICATIONS

Joseph Enterprises Inc., "The Clapper! Wireless Sound Activated On/Off Switch with Clap Detection for Electrical Outlets," retrieved on May 23, 2022, from https://www.walmart.com/ip/The-Clapper-Wireless-Sound-Activated-On-Off-Switch-with-Clap-Detection-for-Electrical-Outlets/10740655, 9 pages.
Atland, "Move over Alexa, Clapboss is a new clap-activated way to control your smart home," https://9to5toys.com/2017/12/12/clapboss/, Dec. 12, 2017, 19 pages.
Astrohaus, "Clapboss—Clap to control your life!," Kickstarter, last updated Dec. 18, 2017, 31 pages.

(Continued)

*Primary Examiner* — Melur Ramakrishnaiah
(74) *Attorney, Agent, or Firm* — Edell, Shapiro & Finnan, LLC

(57) ABSTRACT

Presented herein are systems and methods for obtaining an audio stream from a microphone of a first participant of an audio and video conference between at least the first participant and a second participant; detecting, in the audio stream, a sound trigger that is noise generated by the first participant and filtered from the audio stream by a noise cancellation filter; in response to detecting the sound trigger, muting a transmission of the audio stream to the second participant; and while muting the transmission of the audio stream to the second participant, receiving a verbal command from the first participant that is used to control a digital or virtual assistant.

20 Claims, 5 Drawing Sheets

(56) References Cited

OTHER PUBLICATIONS

Frimus, "Clap to Light," https://play.google.com/store/apps/details?id=com.frimustechnologies.claptolight&hl=en_US&gl=US, Jul. 9, 2021, 3 pages.

Github, "Whistling Keylock," retrieved from https://github.com/prandoni/COM303/blob/master/WhistlingKeylock/WhistlingKeylock.ipynb, on May 23, 2022, 13 pages.

* cited by examiner

MEETING-TRANSPARENT SOUND TRIGGERS AND CONTROLS

TECHNICAL FIELD

The present disclosure relates to systems and methods for controlling a virtual or digital assistant using meeting-transparent sound triggers.

BACKGROUND

In recent years, both video conferencing systems and digital personal assistant systems have gained popularity. However, the concurrent use of existing video conferencing systems and existing digital personal assistant systems together has sometimes proven to be inconvenient. Existing personal digital assistants generally operate by the user first speaking a series of verbal wake words then speaking verbal commands or inquiries. If the video conferencing system and the digital personal assistant system share a single microphone or multiple microphones (i.e., the user uses the same microphone or microphones to speak to other audio/video conference meeting participants and to communicate with their digital personal assistant), other participants of the audio/video conference will be annoyingly subjected to hearing the user's verbal wake words and verbal commands because the user's microphone must be unmuted to communicate with the digital personal assistant.

Even if the user uses two separate microphones, i.e., one used to speak to a digital personal assistant and another ("meeting microphone") used to speak during the audio/video conference meeting, the user is nevertheless inconvenienced because any alternation between using the personal digital personal assistant and speaking to the audio/video conference meeting participants forces the user to either mute or unmute themselves. When the user interacts with their digital personal assistant, the user's meeting microphone must be muted to avoid disrupting the audio/video conference meeting participants with the verbal wake words and commands. If after interacting with the digital personal assistant, the user subsequently desires to speak to the audio/video conference participants, the user must then unmute their meeting microphone. Further, if after speaking to the audio/video conference participants, the user subsequently desires to interact with their digital personal assistant, the user must again mute their meeting microphone. This constant need to mute and unmute a microphone every time one alternates between speaking to meeting participants and interacting with a personal digital assistant is time consuming and tedious.

Additionally, in some circumstances, it may be difficult or impossible for an audio/video conference meeting participant to mute or unmute themselves. In existing audio/video conferencing systems, a user is generally required to interact with one or more input/output devices to mute or unmute a microphone. For example, the user may be required to physically control a computer mouse, touch a touch screen interface, or otherwise activate buttons on a device or on a graphical user interface. It may be difficult or impossible for a participant of an audio/video conference meeting to perform the physical act required to mute or unmute a microphone if the meeting participant's hands are preoccupied or otherwise not adjacent to the required computer mouse, touch screen, or button. Such circumstances may arise, e.g., while an individual in an audio/video conference meeting is giving a presentation to the audio/video conference meeting, driving, typing on a keyboard, or taking hand-written notes with a pen or pencil and paper. Therefore, there is a need for a hands-free method of interacting with a personal digital assistant during an audio/video conference meeting in a convenient manner that does not distract or disrupt other audio/video conference meeting participants.

DESCRIPTION OF EXAMPLE EMBODIMENTS

Overview

Figure 1:
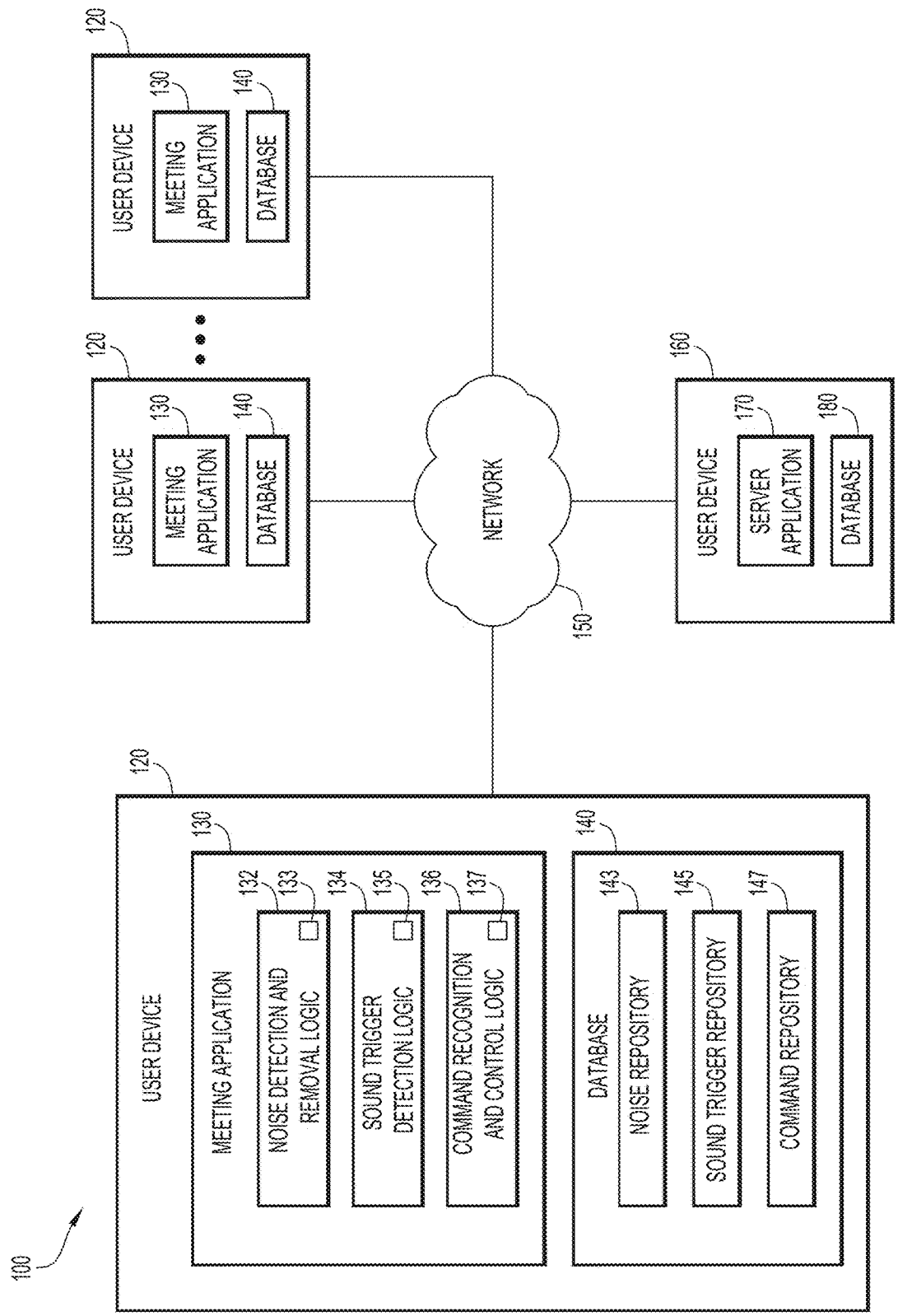
FIG. 1 is a high level diagram of a system including, inter alia, user devices that host meeting applications that include noise detection and removal logic, sound trigger detection logic, and command recognition and control logic, according to an example embodiment.

Presented herein are systems and methods for detecting and removing noise from audio of a participant of an audio and video conference meeting; detecting a sound trigger included in the noise; based on detecting the sound trigger, initiating a command listening mode during which transmission of the participant's audio is muted to other meeting participants; and during the command listening mode, receiving a sound command generated by the participant that controls a personal digital assistant. A method may involve obtaining an audio stream from a microphone of a first participant of an audio and video conference between at least the first participant and a second participant; detecting, in the audio stream, a sound trigger that is noise generated by the first participant and filtered from the audio stream by a noise cancellation filter; in response to detecting the sound trigger, muting a transmission of the audio stream to the second participant; and while muting the transmission of the audio stream to the second participant, receiving a sound command generated by the first participant that is used to control a digital or virtual assistant. As used herein, the term "microphone" may refer to any audio capture device including at least one physical microphone configured to provide at least one audio channel.

In another embodiment, a device is provided. The device includes an interface configured to enable network communications, a memory, and one or more processors coupled to the interface and the memory, and configured to: obtain an audio stream from a microphone of a first participant of an audio and video conference between at least the first participant and a second participant; detect, in the audio stream, a sound trigger that is noise generated by the first participant and filtered from the audio stream by a noise cancellation filter; in response to detecting the sound trigger, mute a transmission of the audio stream to the second participant; and while muting the transmission of the audio stream to the second participant, receive a sound command generated by the first participant that is used to control a digital or virtual assistant.

In yet another embodiment, one or more non-transitory computer readable storage media may be encoded with instructions that, when executed by a processor, cause the processor to detect and remove noise from audio of a participant of an audio and video conference meeting; detect a sound trigger included in the noise; based on detecting the sound trigger, initiate a command listening mode during which transmission of the participant's audio is muted to other meeting participants; and during the command listening mode, receive a sound command generated by the participant that controls a personal digital assistant. When executing the instructions, the processor may obtain an audio stream from a microphone of a first participant of an audio and video conference between at least the first participant and a second participant; detect, in the audio stream, a sound trigger that is noise generated by the first participant and filtered from the audio stream by a noise cancellation filter; in response to detecting the sound trigger, mute a transmission of the audio stream to the second participant; and while muting the transmission of the audio stream to the second participant, receive a sound command generated by the first participant that is used to control a digital or virtual assistant.

EXAMPLE EMBODIMENTS

Existing digital personal assistant devices have been used to, e.g., control Internet of Things ("IoT") devices such as lights, thermostats, and other IoT devices. A digital personal assistant device, e.g., Amazon Alexa™, may require a user to speak a predetermined verbal phrase ("wake words" or "trigger words") into a microphone within the device. When the device detects the trigger words, which may be, e.g., "Hey Alexa," the device enters a listening mode during which the user may speak a verbal command in the form of another predetermined verbal phrase.

However, existing video conferencing technology and existing digital personal assistant technology, when used together, have failed to provide convenient hands-free control. In particular, if a video conference meeting participant wishes to use the existing digital personal assistant technology, the video conference meeting participant's microphone must be unmuted in order for the digital personal assistant software to receive the participant's audio, which includes the trigger words. Because the meeting participant's microphone is unmuted while the meeting participant speaks the trigger words, the other meeting participants included in the video conference hear the meeting participant's trigger words, which would likely be distracting, and irrelevant to the purpose of the meeting. Accordingly, there is a need for less distracting, and more effective way for a meeting participant to interact with a digital personal assistant during a videoconference meeting.

According to aspects of the present disclosure, systems and methods are presented that enhance one or more users' videoconferencing meeting experience by enabling a meeting participant to interact with their digital personal assistant during a video conference in a manner that is unobtrusive and inconspicuous to the other meeting participants.

FIG. 1 is a high level diagram of a system 100 including, inter alia, user devices 120 that each host a meeting application 130 that includes noise detection and removal logic 132, sound trigger detection logic 134, and command recognition and control logic 136, according to an example embodiment. Each of the user devices 120 further includes a database 140 and is configured to communicate with a meeting server 160 via a network 150. While the meeting server 160 is generally described as being one server, the meeting server 160 may be implemented by a plurality of servers. The meeting server 160, which may include a server application 170 and a database 180, may be configured to provide an online meeting service for hosting a communication session among user devices 120. Additionally, in some embodiments, the meeting server 160 may be absent from the system 100 or may not be used in communication between the user devices 120. For example, the user devices 120 may communicate using a point-to-point protocol, which may use a (virtual or physical) direct link between user devices 120. As will be explained in more detail below, each of the user devices 120 may be configured to detect and remove noise from audio of a participant of an audio and video conference meeting, detect a sound trigger included in the noise, based on detection of the sound trigger, initiate a command listening mode during which transmission of the participant's audio is muted to other meeting participants, and during the command listening mode, receive a verbal or non-verbal sound command generated by the participant that controls a personal digital assistant.

The user devices 120 may be tablets, laptop computers, desktop computers, smartphones, virtual desktop clients, video conference endpoints, or any user device now known or hereinafter developed that can run a meeting client, such as a meeting application 130, or similar communication functionality. The user devices 120 may have a dedicated physical keyboard or touch-screen capabilities to provide a virtual on-screen keyboard to enter text. The network 150 may include wired local and wide-area networks as well as wireless local and wide-area networks. The user devices 120 may also have short-range wireless system connectivity (such as Bluetooth™ wireless system capability, ultrasound communication capability, etc.) to enable local wireless connectivity with a videoconference endpoint in a meeting room or with other user devices in the same meeting room.

Figure 2:
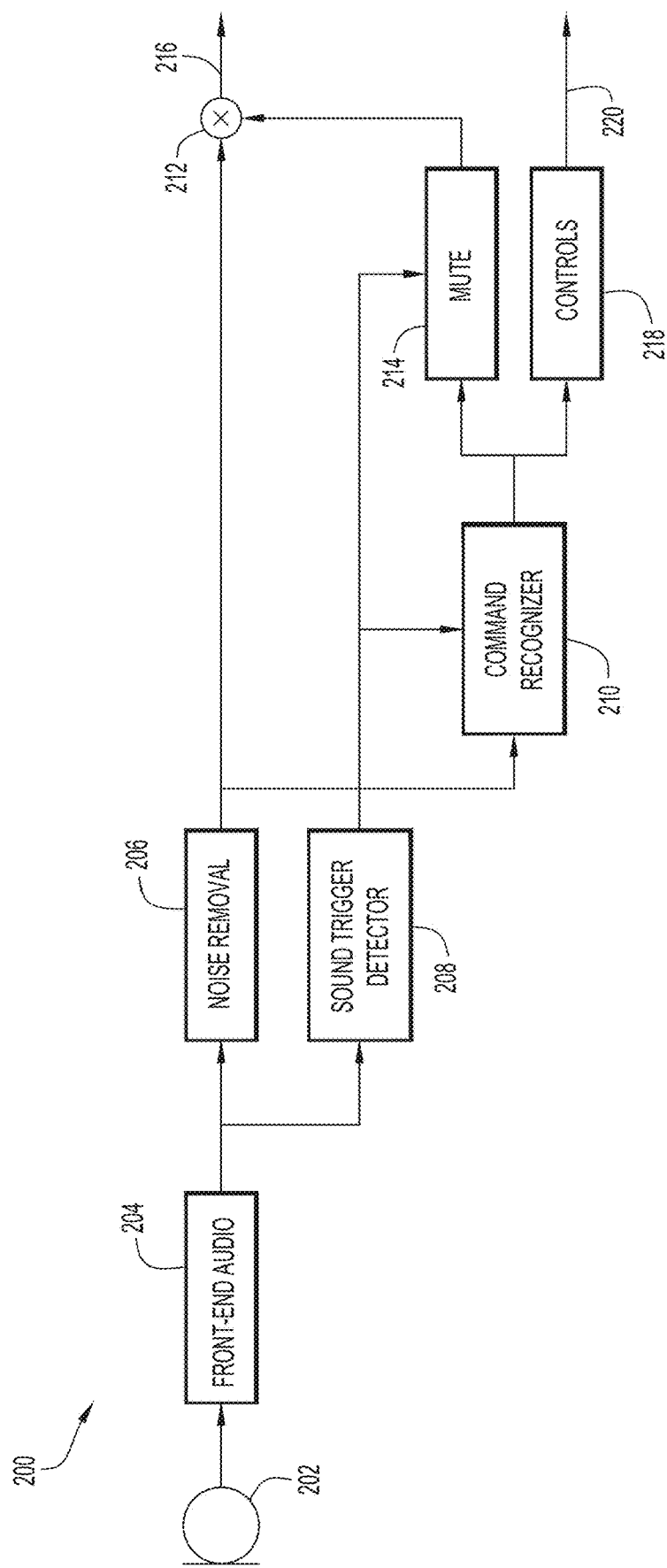
FIG. 2 is a block diagram showing a general flow of detecting and removing noise, recognizing a command, and performing control functions based on the recognized commands, according to a first example embodiment.

As discussed further with respect to FIG. 2, a meeting application 130 may receive and process sound signals, which may include noise and spoken words. For example, meeting application 130 may generate audio data from sound signals input at one or more microphones (not shown) coupled to each of the user devices 120. The meeting application 130 may transmit the generated audio data to the meeting server 160 via network 150. The meeting application 130 may further be configured to receive or generate video data from video signals input at one or more cameras (not shown) coupled to the user devices 120.

The meeting application 130 may detect noise, partially or entirely remove the noise in near real-time using appropriate filtering techniques, detect a trigger masqueraded as noise (as will be explained), recognize commands, and perform control functions based on recognizing the commands. Further, in some possible implementations, the removal of the noise, detection of the triggers included in or masqueraded as the noise, recognition of the commands, and the performance of control based on recognition of the commands may be partially performed by the meeting server 160. Thus, a meeting application 130 and/or meeting server 160 may use the techniques described herein to enable a meeting participant to interact with their digital personal assistant during a video conference meeting in a manner that is unobtrusive and inconspicuous to the other meeting participants. An embodiment in which the meeting server 160 performs some or all of these functions may be implemented where processing or computing resources are limited on one or more of the user devices 120. However, a more practical embodiment is one in which the user devices 120 perform most or all of these functions.

Still referring to FIG. 1, the noise detection and removal logic 132, sound trigger detection logic 134, and command recognition and control logic 136 may respectively include noise detection criteria 133, sound trigger detection criteria 135, and command recognition criteria 137. The database 140 may include a noise repository 143, a sound trigger repository 145, and a command repository 147. The noise detection and removal logic 132 may use at least one of noise detection criteria 133 and noise repository 143 to detect and remove one or more noises included in received or generated audio data. The sound trigger detection logic 134 may use at least one of sound trigger detection criteria 135 and sound trigger repository 145 to detect one or more sound triggers included in the noise of the received or generated audio data. The command recognition and control logic 136 may use at least one of command recognition criteria 137 and command repository 147 to detect one or more commands included in the received or generated audio data.

In the embodiment shown in FIG. 1, the database 140 is a component separate from the meeting application 130, but in an alternative embodiment, the database 140 may be included in the meeting application 130. In yet another embodiment, at least one of the noise repository 143, sound trigger repository 145, and the command repository 147 may be stored at a location outside of the user device 120, e.g., in the database 180 within the meeting server 160.

Further, in the embodiment shown in FIG. 1, the noise detection and removal logic 132, sound trigger detection logic 134, and command recognition and control logic 136 are components included in the meeting application 130, but in an alternative embodiment, at least one of the noise detection and removal logic 132, sound trigger detection logic 134, and command recognition and control logic 136 may be included separately from the meeting application 130 and/or may be included in the server application 170. In yet another embodiment, the meeting application 130 and the server application 170 may both be configured to partially or entirely perform the functions of the noise detection and removal logic 132, sound trigger detection logic 134, and command recognition and control logic 136. Accordingly, the locations of the noise detection and removal logic 132, sound trigger detection logic 134, and command recognition and control logic 136 are not necessarily limited.

At a high level, the systems, methods, and techniques discussed herein may be used to detect noise, remove the noise in near real-time using appropriate filtering techniques, detect a sound trigger masqueraded as noise, recognize commands, and perform control functions based on recognizing the commands.

FIG. 2 is a block diagram showing a system 200 capable of detecting and removing noise, detecting sound triggers in the form of noise, recognizing commands, and performing controls based on the recognized commands, according to a first example embodiment.

In one embodiment, a sound receiving device 202 receives sounds from a first user. The sound receiving device 202 may be one or more microphones or other devices that directly capture sound signals. In the alternative, the sound receiving device 202 may be a device that receives sound signals transferred from another device (not shown). The sound signals captured or received by sound receiving device 202 may be analog or digital sound signals and are received by a front-end audio circuit 204. In one embodiment, the first user is a meeting participant of an audio and video teleconference meeting, and the front-end audio circuit 204 receives the first user's real-time input audio data stream, e.g., during an audio and video conference meeting.

An output of the front-end audio circuit 204 may be supplied to (1) a noise removal component 206, which may execute the noise detection and removal logic 132 (which may be implemented as an analog or digital filter), and (2) a sound trigger detector 208, which may execute the sound trigger detection logic 134. The noise removal component 206 and the sound trigger detector 208 may independently, simultaneously, and respectively execute the noise detection and removal logic 132 and the sound trigger detection logic 134 using the same input supplied from the front-end audio circuit 204.

The noise removal component 206 serves to filter or remove both unintentional noise (e.g., noise of alarms, sirens, babies crying, music, or applause) and intentional noise (i.e., the user's purposefully generated noise for use as a sound trigger). In one embodiment, the noise removal component 206 is configured to compare characteristics of the input audio data stream to characteristics of noises stored in the noise repository 143 and further use noise detection criteria 133 to determine whether portions or aspects of the input audio data stream qualify as noise. As such, the noises stored in the noise repository 143 may include both unwanted noise and noise that the user may intentionally provide to the system 200 as a sound trigger prompting interaction with the user's personal digital assistant, as further described below.

Upon detecting noise, the noise removal component 206 may substantially attenuate or fully remove those portions or aspects of signal supplied by the front-end audio circuit 204 that qualify as noise. As a result, the noise removal component 206 may generate a noiseless or substantially noiseless output audio data stream, which may be transmitted to a command recognizer 210 and, in one possible implementation, a multiplier 212.

The sound trigger detector 208 may detect sound triggers included in the output supplied by front-end audio circuit 204. Notably, in one embodiment, these sound triggers that the user provides are not verbal words but are instead audio patterns that the noise detection and removal logic 132 would qualify as noise. For example, the sound trigger may not include an intelligible word, but instead may include a clap, a click, a snap, a tap, a knock, a whistle, or any combination of such sound triggers, which each may be singular or plural. In one embodiment, artificial intelligence, machine learning, and/or neural network systems may be "trained" and deployed in order to accurately recognize such non-verbal sounds. Further, the system 200 may be "fed" training data thereby causing the system 200 to be particularly efficient at detecting and removing pre-determined categories of sounds or types of sounds.

The sound trigger detector 208 may recognize more than one sound trigger. Further, a sound trigger may be simple and easy for a user to memorize and repeat. For example, a sound trigger may be two consecutive claps spaced by a short interval, which the sound trigger detector 208 may automatically detect. In this example, the type of sound trigger is a clap, there are two instances of this type, and the pattern involves one short interval between the two instances, but the type of sound, number of instances, and associated pattern is not limited thereto and may include any sound types, any number of instances, and any associated pattern.

In one embodiment, the user may choose a sound trigger pattern from a database of pre-recorded sound trigger patterns. The system 200 may be pre-trained to recognize such sound trigger patterns from the database, and a user's choice may be accompanied by sound trigger pattern recognition model that is tailored to the chosen sound trigger pattern. In addition or in the alternative, the system 200 may allow the user to customize one or more sound triggers, which may include any desirable sound trigger pattern. That is, the user may be able to train the system 200 to recognize an arbitrary sound trigger pattern. If the user were given an option to define their own sound trigger patterns, the system 200 may further provide instructions or guidance to assure the user's arbitrary sound trigger pattern will be accurately and reliably detected. In yet another embodiment, the user could choose from a library of simple sounds, such as claps and short tones, and build more complex sound patterns by sequencing them in any desirable fashion. The sequence could be described by an ordered list of those simple sounds and intervals between the consecutive sounds. As an example, several claps spaced by a short interval or a sequence of tones that the user could whistle may be easy for a user to define this way. As noted, however, the sounds included in the sound trigger patterns are likely to be interpreted as noise, which may be removed by the noise removal component 206 preventing distraction other users in a meeting.

In one embodiment, the sound trigger detector 208 may compare characteristics of the output supplied from front-end audio circuit 204 to characteristics of sound triggers stored in the sound trigger repository 145 and use sound trigger detection criteria 135 to determine whether a sound trigger is included in the front-end audio of the front-end audio circuit 204.

In an alternative embodiment, the sound trigger detector 208 may first detect noise in the front-end audio of the front-end audio circuit 204 in a manner similar to the manner in which the noise removal component 206 detects noise. Then the sound trigger detector 208 may subsequently determine whether a sound trigger is included in the detected noise. In this case, the sound trigger detector 208 may compare characteristics of the detected noise to characteristics of sound triggers stored in the noise repository 143 and use sound trigger detection criteria 135 to determine whether a sound trigger is included in the detected noise.

In yet another embodiment (not shown), the sound trigger detector 208 leverages the ability of the noise removal component 206 to detect noise. For example, the noise removal component 206 may perform noise detection and transmit information of the detected noise to the sound trigger detector 208. Then the sound trigger detector 208 may use this information to determine whether a sound trigger is included in the front-end audio of the front-end audio circuit 204. As such, the sound trigger detector 208 and the noise removal component 206 may communicate with one another in some embodiments.

In any embodiment, the sound trigger detector 208 may detect sound triggers or sound trigger patterns that are included in the output from front-end audio circuit 204. Upon such detection, the sound trigger detector 208 may immediately interact with a mute component 214, which causes the multiplier 212 to prevent the transmission of audio data to other users. In one possible implementation, the multiplier 212 receives two inputs: the first being the audio data stream output from the noise removal component 206, and the second being either a "one" or a "zero" from the mute component 214. The final output audio 216 is the result of multiplying these two inputs, and the final output audio 216 is connected via network 150 to other users. When the mute component 214 provides a "one" to the multiplier 212, the final output audio 216 is the noiseless or substantially noiseless audio data stream output from the noise removal component 206. In some embodiments, when the mute component 214 provides a "zero" to the multiplier 212, the final output audio 216 is nothing, i.e., completely muted audio.

In other embodiments, when the final output audio is "muted," the final output audio is not completely muted (i.e., inaudible) but may instead be, e.g., attenuated or replaced with synthetic background noise or other low-level audio sounds. One type of synthetic background noise that could be used is comfort noise, which is noise generated at a low but audible volume and may include, e.g., artificially generated white noise, artificially generated pink noise, birdsong, other sounds of nature, faint city-traffic, etc. These low-level sounds may be preferable over completely muted audio, e.g., because some listeners may mistake completely muted audio for a transmission or connection error and prematurely leave a meeting, or because low-level sounds may provide for less-jarring transitions between "muting" and "unmuting" instances. As such, reference to "muting" or "muted audio" herein does not necessarily refer to completely muted audio but may instead refer to attenuated audio, synthetic background noise, or other low-level audio sounds. In addition to or instead of the multiplier 212 multiplying an audio signal by a one or zero, the system 200 may use a sophisticated protocol to alter the final output audio 216, and in some embodiments alteration of the final output audio 216 may include the use of user-customizable synthetic background noises.

The purpose of the aforementioned immediate muting of the user's audio data stream is to enable the user to unobtrusively provide a command to their digital personal assistant without distracting other users in the user's meeting. Specifically, when the user provides a sound trigger (in the form of noise) and then speaks a command, not only is the sound trigger effectively inaudible to other users (because all noise is attenuated/removed by the noise removal component 206), but also, the spoken command is inaudible to the other users (because the multiplier 212, controlled by the mute component 214, mutes the final output audio 216).

In one embodiment, after a sound trigger is detected, the final output audio 216 is muted for a predetermined period of time. The time during which the meeting application 130 may receive a command from the user may be referred to herein as a command listening mode. The final output audio 216 may be muted during the command listening mode, and thus the user may communicate a command to their digital personal assistant without distracting or disrupting other users included in the audio and video conference.

While in the command listening mode, the user may receive haptic, auditory, or visual cues indicating that the meeting application 130 has entered the command listening mode. Further, the sensory cues may indicate how much time the user has to provide the command. For example, light indicators or beeping sounds that progressively increase in frequency until a prolonged flash or prolonged beep, which signifies the end of the command listening mode, may be administered to the user. In another implementation, a numerical countdown may be displayed on the user's graphical user interface, and the number on the countdown timer may correspond to the amount of seconds that remain in the command listening mode. Alternatively, the meeting application 130 may display a countdown timer that uses a non-numerical dynamic icon such as a circle timer, which includes a radially sweeping line that changes the shade or color of a circle as the available time reduces. In addition to such exemplary sensory cues, any sensory cue now known or later developed may be used for the user to perceive how much time remains in the command listening mode.

In this embodiment, upon the expiration of the predetermined period of time, the system 200 may automatically exit the command listening mode, regardless of whether the command recognizer 210 has recognized a command. Upon exiting the command listening mode, the command recognizer 210 may cause the mute component 214 to control the multiplier 212 to unmute the user's audio, e.g., by changing the input to the multiplier from a zero to a one.

In an alternative embodiment, after a sound trigger is detected, the mute component 214 causes the multiplier 212 to mute the final output audio 216 indefinitely until another sound trigger is detected. That is, the system 200 may enter into a command listening mode and remain in such mode until the user causes the system 200 to exit the command listening mode, e.g., by providing a subsequent sound trigger. In either case, the system 200 may use sound triggers to enter a command listening mode during which the command recognizer 210 may recognize a user's commands.

The command recognizer 210 may accept two inputs: the first being the noiseless or substantially noiseless output audio data stream from the noise removal component 206, and the second being a signal from the sound trigger detector 208 that indicates a sound trigger has been detected. In one embodiment, upon the command recognizer 210 receiving an indication that a sound trigger has been detected, the command recognizer 210 analyzes or processes the output audio data stream received from the noise removal component 206. The command recognizer 210 may, e.g., compare characteristics of the audio data stream to characteristics of commands stored in the command repository 147 and use command recognition criteria 137 to determine whether and which command is included in the audio data stream. The command recognizer 210, upon determining whether and which command is included in the audio data stream, may communicate with either the mute component 214 or a control component 218.

In one embodiment, each of the commands stored in the command repository 147 may be associated with a predetermined action. In one embodiment, one or more of the actions control an aspect of the user's video conference meeting. Exemplary actions that control aspects of the user's video conference meeting may include, e.g., muting or unmuting oneself; muting or unmuting all meeting participants besides oneself; muting or unmuting a specific/specified meeting participant; increasing or decreasing the volume on one's loudspeaker; taking a snapshot, which may capture/store an image of all or a portion of the meeting participant's graphical user interface and/or may capture/store an image of a then-displayed slide of a slideshow if the video conference includes presentation of a slide show; proceeding to a next slide or receding to a previous slide of a slideshow presentation; activating or deactivating one's camera; or beginning, pausing, resuming, or ending recording of the video conference.

Possible actions that the user's digital personal assistant may perform, however, are not limited to actions that control aspects of the user's video conference meeting. For example, other possible commands may relate to answering any articulated question (e.g., about time, weather, or any facts or opinions); setting a timer, alarm, reminder, or navigation destination; ordering food, services, or products; making a payment; buying, selling, or trading any asset; requesting a ride sharing vehicle; purchasing a flight; adding an item to a calendar, to do list, or shopping cart; or controlling one or more IoT devices (not shown). In this regard, possible commands and associated actions include any now known or later developed that a personal digital assistant may perform or facilitate.

In the embodiment shown in FIG. 2, if the command recognizer 210 detects the user has provided a command to mute themselves, the command recognizer 210 communicates with the mute component 214 causing the multiplier 212 to mute the final output audio 216. In contrast, if the final output audio 216 has been muted and the command recognizer 210 detects the user has provided a command to unmute themselves, the command recognizer 210 communicates with the mute component 214 causing the multiplier 212 to unmute the final output audio 216. In one implementation, these mute and unmute commands, which are provided to the command recognizer 210, respectively cause the final output audio 216 to be muted and unmuted indefinitely until the opposite command is received. Of course, these features are in addition to the user's ability to manually mute or unmute themselves by physically interacting with a computer mouse, touch screen, buttons, etc.

Also in the embodiment shown in FIG. 2, if the command recognizer 210 detects the user has provided a command other than a command to mute or unmute themselves, the command recognizer 210 may send a control signal 220 to any component or device to facilitate the action corresponding to the command received. As such, the command recognizer 210 may be connected via network 150 to additional devices, systems, databases, processing resources, or software applications (not shown) that may be used for or may contribute to any functions performed or facilitated by the personal digital assistant.

Accordingly, the combination of the aforementioned components enables a user to interact with a personal digital assistant during a meeting without subjecting others involved in the meeting to (1) distracting sound triggers that wake the personal digital assistant and/or (2) distracting commands that command the user's personal digital assistant. That is, the sound triggers in the form of noise are filtered by the noise removal component 206. And further, when a user device 120 is in the command listening mode, the user's microphone is activated, but the audio data collected by the user's microphone is only transmitted to the command recognizer 210 and not transmitted in the final output audio 216, which is the audio transmitted to other meeting participants. Therefore, the user's interaction with their personal digital assistant is inaudible and inconspicuous to other users.

A practical example of a user using the system 200 is as follows: The user is giving a presentation that includes a slideshow presentation during an audio and video conference. The user provides a sound trigger in the form of two claps then provides a sound command, which may be a verbal command such as the words "next slide." The other meeting participants do not hear either the sound trigger (claps) or sound command ("next slide"), and the user's digital personal assistant responds by performing the commanded action, i.e., advancing to the user's next presentation slide. In an alternative embodiment, the sound command is not verbal but non-verbal. For example, after the user provides a double-clap sound trigger, the user may provide another clap sequence, which the system 200 recognizes as corresponding to the "next slide" action. In yet another embodiment, the system 200 may be configured such that the presenter's two claps form the "next slide" command, and therefore the presenter's two claps by themselves cause the user's digital personal assistant to advance the user's next presentation slide without requiring the user to utter a verbal command. As such, the presenter may control their personal digital assistant without uttering any words. In yet another use case, a listening user, who does not want to disturb the presenter, may use a similar process to control their own personal digital assistant. As such, the presenter and every meeting participant is capable of simultaneously and unobtrusively controlling their own personal digital assistant to perform their desired action.

In the embodiment shown in FIG. 2, the command recognizer 210 receives de-noised input from the noise removal component 206. Therefore, the commands in this embodiment are not in the form of noise. This embodiment is advantageous in that the command recognizer 210 receives a relatively clear audio input that does not include noise. However, in other embodiments, commands may take the form of noise, as further discussed below with respect to FIG. 3.

Figure 3:
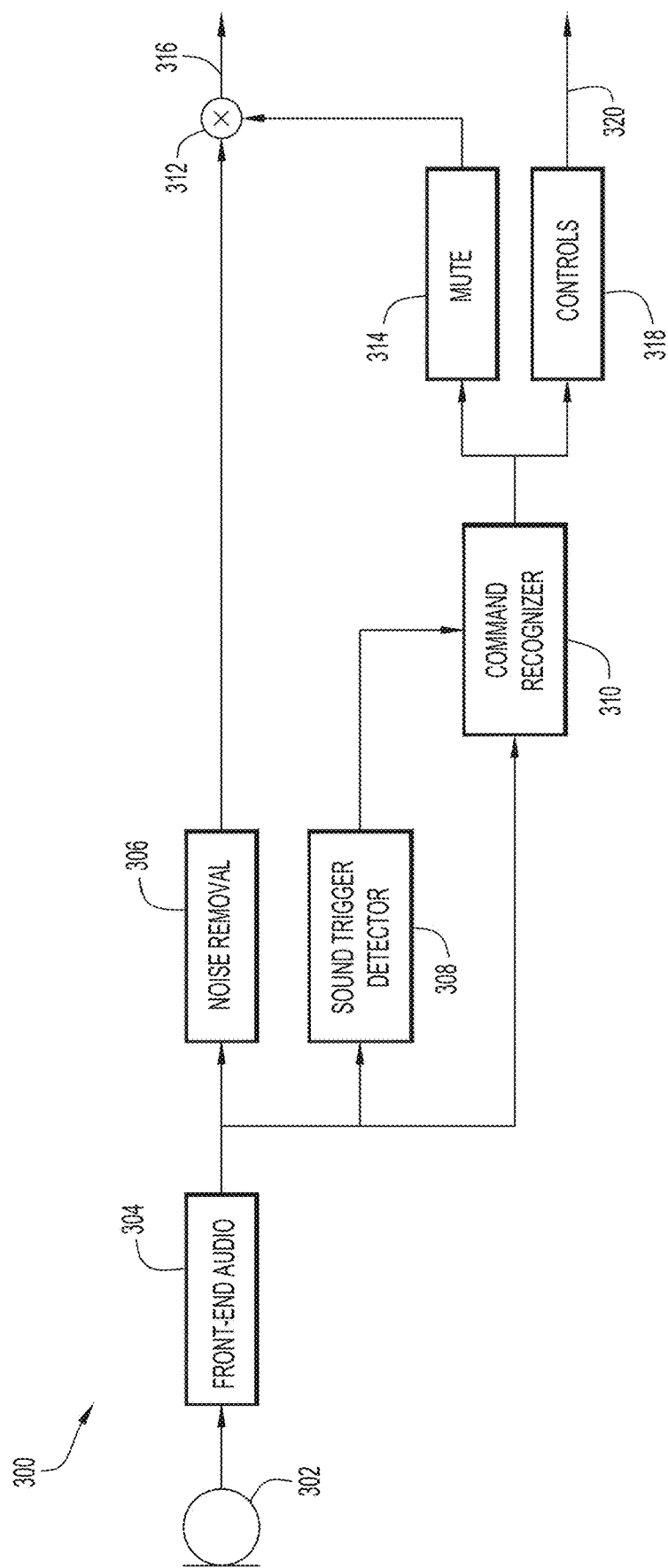
FIG. 3 is a block diagram showing a general flow of detecting and removing noise, recognizing a command, and performing control functions based on the recognized commands, according to a second example embodiment.

FIG. 3 shows one such embodiment in which commands may take the form of noise. FIG. 3 specifically shows a system 300 capable of detecting and removing noise, detecting sound triggers in the form of noise, recognizing commands in the form of noise, and performing controls based on the recognized commands, according to a second example embodiment.

The embodiment shown in FIG. 3 includes a sound receiving device 302, front-end audio circuit 304, noise removal component 306, sound trigger detector 308, command recognizer 310, multiplier 312, mute component 314, final output audio 316, control component 318, and control signal 320, which generally respectively correspond to the sound receiving device 202, front-end audio circuit 204, noise removal component 206, sound trigger detector 208, command recognizer 210, multiplier 212, mute component 214, final output audio 216, control component 218, and control signal 220. As such, a detailed description of these components is omitted for brevity, and the following discussion focuses on the differences between the embodiments shown in FIGS. 2 and 3.

In FIG. 3, an output of the front-end audio circuit 304 may be transmitted, not only to the noise removal component 306 and sound trigger detector 308 but also, directly to the command recognizer 310. While the noise removal component 306 may generate a noiseless or substantially noiseless output audio data stream, this output audio data stream may only be supplied to the multiplier 312. Further, while the sound trigger detector 308 may detect sound triggers included in the front-end audio of the front-end audio circuit 304, the sound trigger detector 308 may solely communicate with the command recognizer 310.

In this regard, the command recognizer 310 is tailored to receive noise commands included in the front-end audio of the front-end audio circuit 304, from which noise has not been filtered. In particular, upon detecting a sound trigger in the form of noise, the sound trigger detector 308 may cause the system 300 to enter a command listening mode, during which the command recognizer 310 may recognize commands in the form of noise. Similar to the embodiment described above, the sound trigger may prompt the command recognizer 310 to enter the command listening mode for a predetermined period of time or indefinitely until another sound trigger is received. Similar to the embodiment shown in FIG. 2, commands may cause the command recognizer to interact with either the mute component 314 (to mute/unmute the final output audio 316 if a non-verbal mute/unmute command is detected) or the control component 318 (if a non-verbal command is detected that is not the non-verbal mute/unmute command). In this embodiment, a non-verbal sound trigger in the form of noise causes the system 300 to enter the command listening mode, and another non-verbal sound in the form of noise may be recognized as a command by the command recognizer 310.

In another embodiment, however, the sound trigger detector 308 may be combined with the command recognizer 310 such that the command recognizer 310 is in command listening mode at all times. That is, the user is not necessarily required to provide a sound trigger prior to providing the noise command. In other words, a sound trigger in the form of noise may be recognized as corresponding to a predetermined commands.

By using non-verbal sounds in the form of noise as commands instead of verbal commands, the system may perform the commanded actions more quickly because the system would not be required to listen for and process a verbal command. Processing verbal commands may require natural language processing, which may be relatively time consuming and may cause a delay in the performance of the commanded action. Importantly, the embodiments shown in FIGS. 2 and 3 are not necessarily mutually exclusive and may be used together. That is, there may be an embodiment (not shown), which accepts both verbal commands and commands in the form of non-verbal noise. In one embodiment, the user could have a sound pattern for muting and/or unmuting the device, another for bringing up a voice assistant (to accept voice commands) or have further meeting controls (start, join, or leave meeting). Other combinations, of course, could be conceived and used.

Figure 4:
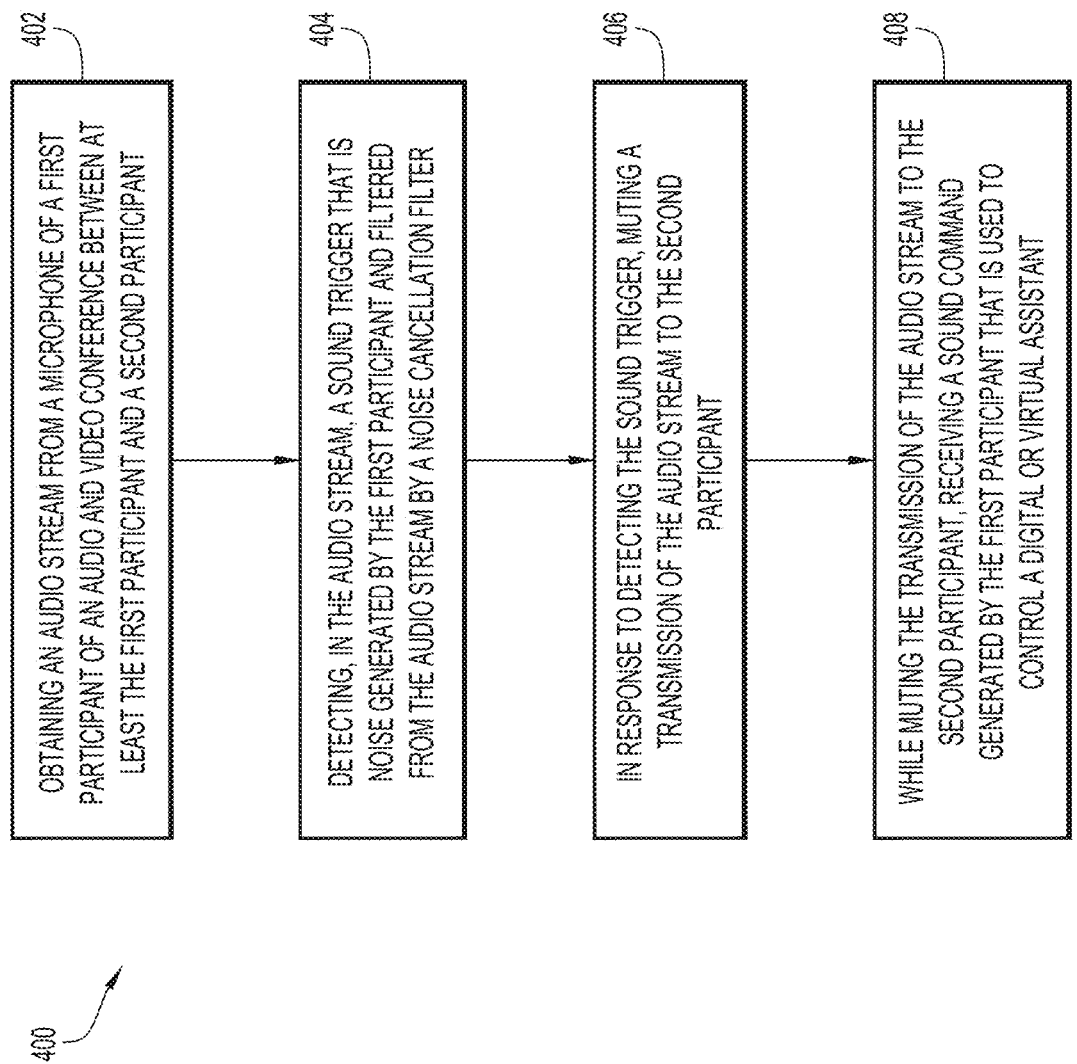
FIG. 4 is a flow chart depicting a series of operations for executing noise detection and removal logic, sound trigger detection logic, and command recognition and control logic, according to an example embodiment.

FIG. 4 is a flow chart depicting a series of operations 400 for executing noise detection and removal logic, sound trigger detection logic, and command recognition and control logic, according to an example embodiment. In accordance with this embodiment, at operation 402, an operation involves obtaining an audio stream from a microphone of a first participant of an audio and video conference between at least the first participant and a second participant. At operation 404, an operation involves detecting, in the audio stream, a sound trigger that is noise generated by the first participant and filtered from the audio stream by a noise cancellation filter. At operation 406, an operation involves, in response to detecting the sound trigger, muting a transmission of the audio stream to the second participant. And at operation 408, an operation involves, while muting the transmission of the audio stream to the second participant, receiving a sound command generated by the first participant that is used to control a digital or virtual assistant.

Figure 5:
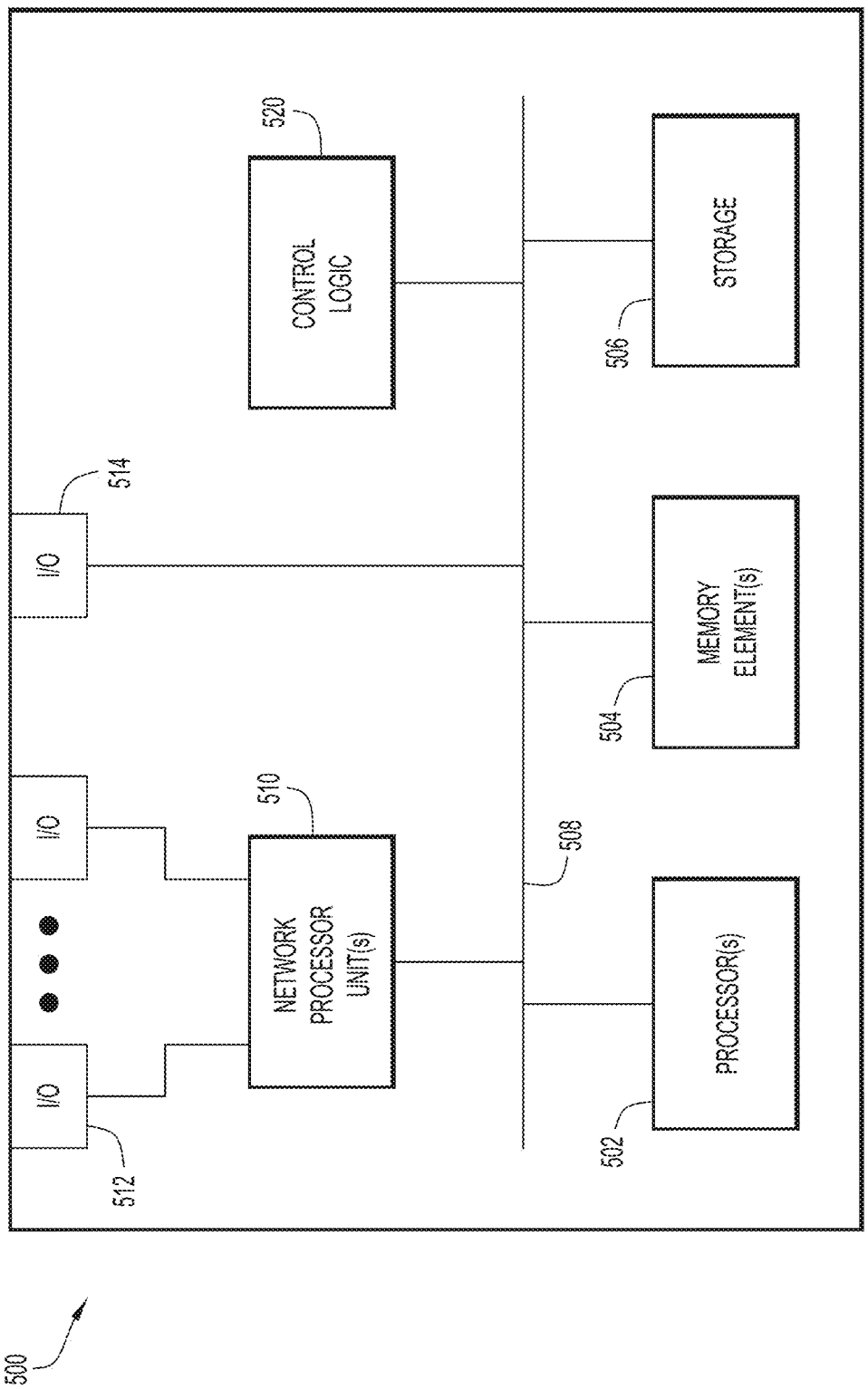
FIG. 5 is a block diagram of a device that may be configured to execute noise detection and removal logic, sound trigger detection logic, and command recognition and control logic and perform the techniques described herein, according to an example embodiment.

FIG. 5 is a block diagram of a device that may be configured to execute noise detection and removal logic 132, sound trigger detection logic 134, and command recognition and control logic 136 and perform the techniques described herein, according to an example embodiment. A computing device 500 may be configured to perform functions associated with operations discussed herein in connection with the techniques depicted in FIGS. 1-4. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520 (which could include, for example, noise detection and removal logic 132, sound trigger detection logic 134, and command recognition and control logic 136). In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In sum, in one embodiment, a method is provided. The method may include obtaining an audio stream from a microphone of a first participant of an audio and video conference between at least the first participant and a second participant, detecting, in the audio stream, a sound trigger that is noise generated by the first participant and filtered from the audio stream by a noise cancellation filter, in response to detecting the sound trigger, muting a transmission of the audio stream to the second participant, and while muting the transmission of the audio stream to the second participant, receiving a sound command generated by the first participant that is used to control a digital or virtual assistant.

In another implementation, the sound command generated by the first participant may be a verbal command. In the alternative, the sound command generated by the first participant may be a non-verbal command.

Also, the sound command generated by the first participant may be used to control an aspect of the audio and video conference. Additionally, the sound command generated by the first participant may be used to answer an articulated question, set a timer, set an alarm, set a reminder, order food, order services, order products, make a payment, purchase an asset, sell an asset, trade an asset, request a ride sharing vehicle, purchase a flight, add an item to a calendar, add an item to a to-do list, add an item to a shopping cart, or control an internet-of-things device.

In another implementation, the sound trigger may be a sound that is incapable of being perceived (e.g., interpreted or understood) as speech. In yet another implementation, the sound trigger may be a clap, a click, a snap, a tap, a knock, a whistle, or any combination of such sound triggers, which each may be singular or plural.

Sound triggers may include short impulses of sound. In one implementation, a length of time during which a portion of the sound trigger is completed may be less than or equal to 500 milliseconds. One exemplary portion of a sound trigger having a duration of 500 milliseconds or less may be a short whistle. A combination of portions of sound triggers may be combined to form a given sound trigger. In another implementation, the length of time during which a portion of the sound trigger is completed may be less than or equal to 100 milliseconds. One exemplary portion of a sound trigger having a duration of 100 milliseconds or less may be a clap, a click, a snap, a tap, or a knock. While short trigger sounds may be used, the length of the trigger sound is not necessarily limited thereto. For example, portions of sound triggers having longer lengths may be used in some embodiments, and thus the length of a portion of the sound trigger (as well as the length of the entire sound trigger itself) is not limited to any particular duration.

The sound trigger may include a repeating pattern. The repeating pattern may include claps, clicks, snaps, taps, knocks, whistles, or any combination of such sounds.

In one implementation, the sound command generated by the first participant may be received via the noise cancellation filter. Further, the sound command generated by the first participant may be received without first being processed by the noise cancellation filter.

The method may further include providing a visual indication that the transmission of the audio stream to the second participant is being muted while muting the transmission of the audio stream to the second participant.

An apparatus may be provided. The apparatus may include a memory, a network interface configured to enable network communication, and one or more processors coupled to the interface and memory. The one or more processors may be configured to obtain an audio stream from a microphone of a first participant of an audio and video conference between at least the first participant and a second participant, detect, in the audio stream, a sound trigger that is noise generated by the first participant and filtered from the audio stream by a noise cancellation filter, in response to detecting the sound trigger, mute a transmission of the audio stream to the second participant, and while muting the transmission of the audio stream to the second participant, receive a sound command generated by the first participant that is used to control a digital or virtual assistant.

In one implementation, the sound command generated by the first participant is a verbal command. In another implementation, the sound command generated by the first participant is a non-verbal command. The sound trigger may be a clap, a click, a snap, a tap, a knock, or a whistle, or any combination of such sound triggers, which each may be singular or plural.

In still another embodiment, one or more non-transitory computer readable storage media encoded with instructions that, when executed by a processor, cause the processor to execute a method that includes obtaining an audio stream from a microphone of a first participant of an audio and video conference between at least the first participant and a second participant, detecting, in the audio stream, a sound trigger that is noise generated by the first participant and filtered from the audio stream by a noise cancellation filter, in response to detecting the sound trigger, muting a transmission of the audio stream to the second participant, and while muting the transmission of the audio stream to the second participant, receiving a sound command generated by the first participant that is used to control a digital or virtual assistant.

In one implementation, the sound trigger may be a clap, a click, a snap, a tap, a knock, or a whistle, or any combination of such sound triggers, which each may be singular or plural.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
obtaining an audio stream from a microphone of a first participant of an audio and video conference between at least the first participant and a second participant;
detecting, in the audio stream, a sound trigger that is noise generated by the first participant and filtered from the audio stream by a noise cancellation filter;
in response to detecting the sound trigger, muting a transmission of the audio stream to the second participant; and
while muting the transmission of the audio stream to the second participant, receiving a sound command generated by the first participant that is used to control a digital or virtual assistant.

2. The method of claim 1, wherein:
the sound command generated by the first participant is a verbal command.

3. The method of claim 1, wherein:
the sound command generated by the first participant is a non-verbal command.

4. The method of claim 1, wherein:
the sound command generated by the first participant is used to control an aspect of the audio and video conference.

5. The method of claim 1, wherein:
the sound command generated by the first participant is used to answer an articulated question, set a timer, set an alarm, set a reminder, set a navigation destination, order food, order services, order products, make a payment, purchase an asset, sell an asset, trade an asset, request a ride sharing vehicle, purchase a flight, add an item to a calendar, add an item to a to-do list, add an item to a shopping cart, or control an internet-of-things device.

6. The method of claim 1, wherein:
the sound trigger is a sound that is incapable of being perceived as speech.

7. The method of claim 6, wherein:
the sound trigger is at least one of a clap, a click, a snap, a tap, a knock, or a whistle.

8. The method of claim 1, wherein:
a length of time during which a portion of the sound trigger is completed is less than or equal to 500 milliseconds.

9. The method of claim 1, wherein:
a length of time during which a portion of the sound trigger is completed is less than or equal to 100 milliseconds.

10. The method according to claim 1, wherein:
the sound trigger comprises a repeating pattern.

11. The method of claim 10, wherein:
the repeating pattern comprises claps, clicks, snaps, taps, knocks, or whistles.

12. The method of claim 1, wherein:
the sound command generated by the first participant is received via the noise cancellation filter.

13. The method of claim 1, wherein:
the sound command generated by the first participant is received without first being processed by the noise cancellation filter.

14. The method of claim 1, further comprising:
providing a visual indication that the transmission of the audio stream to the second participant is being muted while muting the transmission of the audio stream to the second participant.

15. An apparatus comprising:
a memory;
a network interface configured to enable network communication; and
one or more processors coupled to the network interface and the memory, and configured to:
obtain an audio stream from a microphone of a first participant of an audio and video conference between at least the first participant and a second participant;
detect, in the audio stream, a sound trigger that is noise generated by the first participant and filtered from the audio stream by a noise cancellation filter;
in response to detecting the sound trigger, mute a transmission of the audio stream to the second participant; and
while muting the transmission of the audio stream to the second participant, receive a sound command generated by the first participant that is used to control a digital or virtual assistant.

16. The apparatus of claim 15, wherein:
the sound command generated by the first participant is a verbal command.

17. The apparatus of claim 15, wherein:
the sound command generated by the first participant is a non-verbal command.

18. The apparatus according to claim 15, wherein:
the sound trigger comprises a clap, click, snap, tap, knock, or whistle.

19. One or more non-transitory computer readable storage media encoded with instructions that, when executed by a processor, cause the processor to execute a method comprising:
obtaining an audio stream from a microphone of a first participant of an audio and video conference between at least the first participant and a second participant;
detecting, in the audio stream, a sound trigger that is noise generated by the first participant and filtered from the audio stream by a noise cancellation filter;
in response to detecting the sound trigger, muting a transmission of the audio stream to the second participant; and
while muting the transmission of the audio stream to the second participant, receiving a sound command generated by the first participant that is used to control a digital or virtual assistant.

20. The one or more non-transitory computer readable storage media of claim 19, wherein:
the sound trigger comprises a clap, click, snap, tap, knock, or whistle.

* * * * *